US012798625B2

United States Patent
(12) United States Patent
Hergeth et al.

(10) Patent No.: US 12,798,625 B2
(45) Date of Patent: Nov. 17, 2026

(54) CHANGING THE CONFIGURATION OF AN ACTIVE SAFETY SYSTEM OF AN AUTOMATED MOTOR VEHICLE

(71) Applicant: Bayerische Motoren Werke Aktiengesellschaft, Munich (DE)

(72) Inventors: Sebastian Hergeth, Munich (DE); Philipp Kerschbaum, Munich (DE); Felix Lauber, Munich (DE); Julia Mejia Hernandez, Munich (DE); Frederik Platten, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 922 days.

(21) Appl. No.: 17/917,191

(22) PCT Filed: Mar. 3, 2021

(86) PCT No.: PCT/EP2021/055328
§ 371 (c)(1),
(2) Date: Oct. 5, 2022

(87) PCT Pub. No.: WO2021/213719
PCT Pub. Date: Oct. 28, 2021

(65) Prior Publication Data

US 2023/0182783 A1 Jun. 15, 2023

(30) Foreign Application Priority Data

Apr. 20, 2020 (DE) ..................... 10 2020 110 714.5

(51) Int. Cl.
*B60W 60/00* (2020.01)
*B60W 30/12* (2020.01)

(52) U.S. Cl.
CPC .... *B60W 60/0055* (2020.02); *B60W 60/0015* (2020.02); *B60T 2201/022* (2013.01); *B60T 2201/083* (2013.01); *B60W 30/12* (2013.01)

(58) Field of Classification Search
CPC ......... B60W 60/0055; B60W 60/0015; B60W 30/12; B60T 2201/022; B60T 2201/083
See application file for complete search history.

(56) References Cited

U.S. PATENT DOCUMENTS 10,124,775 B2 * 11/2018 Svensson ................. B60T 7/22
2015/0006028 A1 1/2015 Strauss
(Continued)

FOREIGN PATENT DOCUMENTS

CN 108749818 A 11/2018
DE 10 2013 013 865 B3 2/2015
(Continued)

OTHER PUBLICATIONS

EP3036144B1 machine translation (Year: 2017).*
(Continued)

*Primary Examiner* — Navid Z. Mehdizadeh
*Assistant Examiner* — Oliver Tan
(74) *Attorney, Agent, or Firm* — Crowell & Moring LLP

(57) ABSTRACT

A controller for changing between a respective first configuration and a respective second configuration of at least one active safety system of an automated motor vehicle is provided. The controller is configured to detect a change in the operating mode of the motor vehicle from an at least highly automated operating mode into a maximally partially automated operating mode and to change the at least one active safety system from the first configuration to the second configuration when a change is detected.

11 Claims, 1 Drawing Sheet

(56) References Cited

U.S. PATENT DOCUMENTS

| | | | | |
|---|---|---|---|---|
| 2016/0325757 | A1* | 11/2016 | Westlund | G05D 1/0061 |
| 2016/0339880 | A1 | 11/2016 | Svensson et al. | |
| 2017/0101107 | A1* | 4/2017 | Milch | B60W 40/09 |
| 2017/0227958 | A1 | 8/2017 | Freinenstein et al. | |
| 2018/0299890 | A1 | 10/2018 | Ewert | |
| 2019/0382018 | A1* | 12/2019 | Garnault | B60W 30/18163 |
| 2020/0122694 | A1* | 4/2020 | Eigel | B60W 10/18 |
| 2020/0239071 | A1* | 7/2020 | Lenneman | B62D 15/029 |
| 2021/0171066 | A1* | 6/2021 | Koehler | B60W 30/10 |
| 2024/0092355 | A1* | 3/2024 | Newman | B60W 10/20 |

FOREIGN PATENT DOCUMENTS

| | | | | |
|---|---|---|---|---|
| DE | 10 2016 208 217 | A1 | 11/2016 | |
| DE | 10 2015 011 564 | A1 | 3/2017 | |
| DE | 10 2016 201 805 | A1 | 8/2017 | |
| DE | 10 2018 210 367 | A1 | 1/2020 | |
| DE | 10 2018 210 368 | A1 | 1/2020 | |
| DE | 10 2018 130 431 | A1 | 6/2020 | |
| EP | 3036144 | B1 * | 6/2017 | B60W 30/08 |
| WO | WO 2013/127387 | A1 | 9/2013 | |
| WO | WO 2015/024620 | A1 | 2/2015 | |

OTHER PUBLICATIONS

International Search Report (PCT/ISA/210) issued in PCT Application No. PCT/EP2021/055328 dated Jun. 15, 2021 with English translation (five (5) pages).

German-language Written Opinion (PCT/ISA/237) issued in PCT Application No. PCT/EP2021/055328 dated Jun. 15, 2021 (five (5) pages).

German-language Search Report issued in German Application No. 10 2020 110 714.5 dated Sep. 29, 2020 with partial English translation (11 pages).

"Rechtsfolgen zunehmender Fahrzeugautomatisierung", Bundesanstalt fuer Strassenwesen (BASt) [German Federal Highway Research Institute], Forschung kompakt [Research News] , Edition Nov. 2012 with English Abstract (two (2) pages).

"(R) Taxonomy and Definitions for Terms Related to Driving Automation Systems for On-Road Motor Vehicles", Surface Vehicle Recommended Practice, SAE (Society of Automotive Engineering) International, J3016TM, Sep. 2016, pp. 1-30 (30 pages).

Cover Page of EP 3 036 144 A1 published Jun. 29, 2016 (one (1) page).

Cover Page of EP 2 819 871 A1 published Jan. 7, 2015 (one (1) page).

English translation of Chinese-language Office Action issued in Chinese Application No. 202180027157.1 dated Apr. 3, 2025 (11 pages).

* cited by examiner

CHANGING THE CONFIGURATION OF AN ACTIVE SAFETY SYSTEM OF AN AUTOMATED MOTOR VEHICLE

BACKGROUND AND SUMMARY OF THE INVENTION

The invention relates to a controller and a method for changing a configuration of an active safety system of an automated motor vehicle.

In the context of the document, the term "automated driving" can be understood to mean driving with automated longitudinal or lateral control or autonomous driving with automated longitudinal and lateral control. The term "automated driving" encompasses automated driving with an arbitrary degree of automation. Exemplary degrees of automation are assisted, partially automated, highly automated or fully automated driving. These degrees of automation were defined by the German Federal Highway Research Institute (BASt) (see BASt publication "Research compact", issue November/2012). In the case of assisted driving, the driver permanently carries out the longitudinal or lateral control, while the system performs the respective other function within certain limits. In the case of partially automated driving (PAD), the system performs the longitudinal and lateral control for a certain period of time and/or in specific situations, wherein the driver must permanently monitor the system as in the case of assisted driving. In the case of highly automated driving (HAD), the system performs the longitudinal and lateral control for a certain period of time, without the driver having to permanently monitor the system; however, the driver must be able to take over control of the vehicle within a certain time. In the case of fully automated driving (FAD), the system can automatically manage driving in all situations for a specific application; a driver is no longer required for this application. The four degrees of automation mentioned above in accordance with the definition by the BASt correspond to SAE levels 1 to 4 of the SAE J3016 standard (SAE—Society of Automotive Engineering). By way of example, highly automated driving (HAD) in accordance with the BASt corresponds to level 3 of the SAE J3016 standard. Furthermore, the SAE J3016 also provides SAE level 5 as the highest degree of automation, which is not contained in the definition by the BASt. SAE level 5 corresponds to driverless driving, wherein the system can automatically manage all situations like a human driver during the entire journey; a driver is generally no longer required.

It is an object of the invention to prevent hazards after a change from an automated operating mode in which the driver does not have to permanently monitor the system into an operating mode in which the driver must permanently monitor the system, or even carries out the longitudinal and/or lateral control himself/herself.

The object is achieved by the claimed invention. It is pointed out that additional features of a patent claim dependent on an independent patent claim without the features of the independent patent claim or only in combination with a subset of the features of the independent patent claim can form a dedicated invention which is independent of the combination of all features of the independent patent claim and which can be made the subject of an independent claim, of a divisional application or of a subsequent application. This applies in the same way to technical teachings which are described in the description and which can form an invention that is independent of the features of the independent patent claims.

A first aspect of the invention relates to a controller for changing between a respective first configuration and a respective second configuration of at least one active safety system of an automated motor vehicle.

In this case, an active safety system is a (sub)system of the automated motor vehicle that is intended to prevent accidents of the automated motor vehicle. In accordance with the definition and nomenclature provided by the BASt, this involves a "driver only" system, or a level 0 system. Consequently, despite the active safety system, the driver of the motor vehicle permanently carries out the longitudinal and lateral control of the motor vehicle. The active safety system only intervenes in the longitudinal and/or lateral control with a reaction if the control of the motor vehicle by the driver might lead to an accident.

An active safety system is in particular a speed safety system that limits the speed of the motor vehicle, or a braking safety system that performs braking in an automated manner, or a warning safety system that warns the driver in good time about a possible accident or possible lane departure, or a lane keeping safety system that prevents a lateral lane boundary line from being crossed in an automated manner.

For reasons of better readability, the functionality of the active safety system is explained below principally on the basis of the example of a braking safety system. However, the braking safety system can be replaced by any other active safety system desired, in particular a lane keeping safety system.

An active safety system can also encompass a plurality of the functions mentioned above and trigger them in a cascaded manner, for example. By way of example, before an imminent collision, a braking safety system may first warn the driver by way of acoustic and/or visual messages before automated braking is actually effected. Alternatively, it is also conceivable for an active safety system to trigger a plurality of reactions of identical type with varying intensity in a cascaded manner. By way of example, the braking safety system may firstly make the driver aware of a possibly imminent collision by way of a brief, relatively weak braking jolt before emergency braking with high intensity—i.e. high deceleration—is effected.

In this case, each of the active safety systems is assigned at least two configurations comprising in particular triggering parameters for at least one reaction of the respective active safety system. In this case, by way of example, the configurations stipulate the parameters under which a reaction is intended to take place and the intensity with which the reaction is intended to take place.

A configuration of the braking safety system stipulates threshold values for times until a collision, for example, and links these threshold values with reactions. In this regard, by way of example, a warning for the driver of the motor vehicle can be output when a first threshold value is reached, and braking can be triggered when a second threshold value is reached.

The controller is designed to recognize a change in an operating mode of the motor vehicle from an at least highly automated operating mode into an at most partially automated operating mode, i.e. in accordance with the SAE definition a change in the operating mode of the motor vehicle from a level greater than or equal to 3 to a level less than or equal to 2.

In particular, for this purpose, the controller is linked with a driving system of the automated motor vehicle that controls the motor vehicle during automated operation. The controller can receive the information about the change in the operating mode from this driving system.

Moreover, the controller is designed to change the at least one active safety system from the first configuration to the second configuration when a change is recognized.

For this purpose, the controller is linked with the at least one active safety system, in particular, and via this link can control the at least one active safety system or alter the configuration thereof.

The second configuration is already stored in the at least one active safety system, for example, and is activated by the controller. As an alternative thereto, the second configuration is stored in the controller and the controller overwrites the configuration present in the at least one active safety system.

In one advantageous embodiment of the invention, the controller is designed to recognize the change in the operating mode of the automated motor vehicle from a highly automated operating mode into an operating mode without automation, and to change the at least one active safety system from the first configuration to the second configuration when a change is recognized.

In accordance with the SAE definition, in this advantageous embodiment, the controller is designed to recognize a change in the operating mode of the automated motor vehicle from level 3 to level 0. In this case, the invention is based on the insight that the change in the operating mode from level 3 to level 0 affords a particular risk potential since in this case the automated motor vehicle changes from an automated operating mode in which the driver does not have to permanently monitor the system into an operating mode without any support during longitudinal and/or lateral control.

In a further advantageous embodiment of the invention, a reaction of the at least one active safety system in the case of the second configuration is triggered at an earlier point in time than a point in time at which the reaction in the case of the first configuration of the at least one active safety system would have been triggered.

In this case, the invention is based on the insight that after the change in the operating mode of the motor vehicle from an at least highly automated operating mode into an at most partially automated operating mode, a reaction time of the driver of the motor vehicle may be increased and the driver of the motor vehicle is thus reliant on the reaction of the active safety system earlier in order to prevent an accident.

In a further advantageous embodiment of the invention, the reaction of the at least one active safety system in the case of the second configuration is triggered at an earlier point in time and with a lower intensity than the point in time and the intensity at which and with which the reaction in the case of the first configuration of the at least one active safety system would have been triggered.

In this case, the invention is based on the insight that after the change in the operating mode of the motor vehicle from an at least highly automated operating mode into an at most partially automated operating mode, the original intensity of the reaction may be unsuitable. By way of example, if the intensity of a braking reaction was designed as emergency braking with high deceleration, then after the change in the operating mode of the motor vehicle from an at least highly automated operating mode into an at most partially automated operating mode, for example, initial braking with low deceleration may be sufficient to make the driver aware of a hazard.

In a further advantageous embodiment of the invention, the at least one active safety system is designed to trigger at least two different reactions dependent on the configuration of the respective active safety system, and wherein a triggering point in time and/or an intensity of at least one of these reactions in the case of the second configuration differ(s) from a triggering point in time and/or an intensity of at least one reaction in the case of the first configuration.

In particular, the number of reactions of the at least one active safety system may also differ between the first configuration and the second configuration. In this regard, for example, intense, late emergency braking may be replaced by an early optical warning signal, followed by slight initial braking and the intense, late emergency braking.

In a further advantageous embodiment of the invention, the controller is designed to determine a point in time after the change of the at least one active safety system from the first configuration to the second configuration, and to change the at least one active safety system from the second configuration to the first configuration depending on this point in time.

In particular, the controller is designed to change the at least one active safety system from the second configuration to the first configuration at the earliest, for example at this point in time.

In this case, the invention is based on the insight that the attentiveness of the driver of the motor vehicle reaches a sufficient level again as of a certain point in time after the change of the at least one active safety system from the first configuration to the second configuration and thus after a change in an operating mode of the automated motor vehicle from an at least highly automated operating mode into an at most partially automated operating mode and, as of this point in time, the reactions of the active safety system that are altered as a result of the change of the configuration of the active safety system might rather be perceived by the driver as disturbing.

In a further advantageous embodiment of the invention, the controller is designed to ascertain an influencing variable, and to determine the point in time depending on the influencing variable.

In particular, a variable that is characteristic of an attentiveness of the driver of the motor vehicle is the influencing variable. In this case, the controller is designed for example to determine the point in time in such a way that in the case of a first influencing variable that is characteristic of lower attentiveness of the driver than a second influencing variable, the point in time determined is later than the point in time determined for the second influencing variable. A variable that is characteristic of the attentiveness of the driver of the motor vehicle is for example a viewing direction of the driver of the motor vehicle.

In particular, a variable that is characteristic of a complexity of the surroundings of the motor vehicle is the influencing variable. In this case, the controller is configured for example to determine the point in time in such a way that in the case of a first influencing variable that is characteristic of a lower complexity of the surroundings than a second influencing variable, the point in time determined is later than the point in time determined for the second influencing variable. A variable that is characteristic of the complexity of the surroundings of the motor vehicle is for example a traffic density around the motor vehicle or a relative speed of the motor vehicle with respect to another road user or a distance between the motor vehicle and a lateral line of a lane or roadway.

In particular, a variable that is characteristic of a speed of the motor vehicle is the influencing variable. In this case, the controller is designed for example to determine the point in time in such a way that in the case of a first influencing variable that is characteristic of a lower speed of the motor vehicle than a second influencing variable, the point in time determined is earlier than the point in time determined for the second influencing variable.

In particular, a variable that is characteristic of a travel distance to a point of interest or a variable that is characteristic of a driving duration to reach a point of interest is the influencing variable. In this case, the controller is designed for example to determine the point in time in such a way that the point in time only succeeds the reaching of the point of interest by the motor vehicle. In this case, the invention is based on the insight that some points of interest require increased attentiveness by the driver of the motor vehicle, for example intersections or a position where there is a high incidence of accidents. In this case, it is expedient to choose the point in time at which the at least one active safety system changes for example at the earliest from the second configuration to the first configuration in such a way that the point in time only succeeds the reaching of the point of interest by the motor vehicle.

In a further advantageous embodiment, the controller is designed to ascertain an influencing variable, and to alter the second configuration of the at least one active safety system depending on the influencing variable when a change in the operating mode of the automated motor vehicle is recognized.

In this case, the influencing variable is in particular one of the influencing variables already mentioned.

As an alternative or in addition to the advantageous embodiment mentioned above, in this case the controller is designed in particular to alter the second configuration of the at least one active safety system depending on the influencing variable when a change in the operating mode of the automated motor vehicle is recognized in such a way as to result in a different number of reactions, other triggering points in time for reactions and/or other intensities for reactions of the active safety system.

By way of example, the intensity of a reaction can be reduced if this reaction is triggered earlier in order that the reaction is less burdensome for the driver of the motor vehicle but enough time for an action on the part of the driver still remains as a result of the temporal bringing forward.

Alternatively or additionally, by way of example, an intensity of a reaction can be increased and/or the reaction can be triggered earlier if the influencing variable indicates that the driver of the motor vehicle is inattentive.

Altering the second configuration of the at least one active safety system depending on the influencing variable can be effected for example by individual parameters of the configuration being changed. As an alternative thereto, it is also possible for a plurality of second configurations to be present, from which a second configuration is then selected depending on the influencing variable.

In a further advantageous embodiment, the automated motor vehicle comprises at least two active safety systems, and the controller is designed to change at least one proper subset of the at least two active safety systems from the first configuration to the second configuration when a change in the operating mode of the automated motor vehicle is recognized.

In this case, a proper subset of the at least two active safety systems is a number of the at least two active safety systems which does not correspond to the total number of the at least two active safety systems.

In this case, the change from the first configuration to the second configuration of the proper subset of the at least two active safety systems can also be effected for each of the active safety systems in the subset in a dedicated manner. By way of example, the configurations or the points in time for the change back to the first configuration can be adapted in this case according to the advantageous embodiments mentioned above.

In a further advantageous embodiment, the controller is designed to determine a variable that is characteristic of a readiness for driving of the driver of the automated motor vehicle, and to alter the second configuration of the at least one active safety system depending on the variable that is characteristic of the driver's readiness for driving when a change in the operating mode of the automated motor vehicle is recognized.

In particular, the variable that is characteristic of the readiness for driving of the driver of the automated motor vehicle is characteristic of a readiness for driving with regard to the longitudinal and/or lateral control of the automated motor vehicle.

By way of example, a variable that is characteristic of a steering intervention by the driver of the motor vehicle is characteristic of a readiness for driving with regard to the lateral control.

By way of example, a variable that is characteristic of a brake or accelerator pedal actuation by the driver of the motor vehicle is characteristic of a readiness for driving with regard to the longitudinal control.

In a further advantageous embodiment of the invention, the controller is designed to recognize a change in the operating mode of the automated motor vehicle from an at least highly automated operating mode into an assisted operating mode in which either the longitudinal control or the lateral control of the motor vehicle continues to be effected in an automated manner, and to change at least one active safety system for the respective longitudinal or lateral control that is no longer effected in an automated manner from the first configuration to the second configuration when a change is recognized.

In particular, the controller is designed to recognize a change in the operating mode of the automated motor vehicle from an at least highly automated operating mode into an assisted operating mode in which the longitudinal control of the motor vehicle continues to be effected in an automated manner, and to change at least one active safety system for the lateral control that is no longer effected in an automated manner from the first configuration to the second configuration when a change is recognized.

In particular, the controller is alternatively designed to recognize a change in the operating mode of the automated motor vehicle from an at least highly automated operating mode into an assisted operating mode in which the lateral control of the motor vehicle continues to be effected in an automated manner, and to change at least one active safety system for the longitudinal control that is no longer effected in an automated manner from the first configuration to the second configuration when a change is recognized.

A second aspect of the invention relates to a method for changing between a respective first configuration and a respective second configuration of at least one active safety system of an automated motor vehicle.

One step of the method is recognizing a change in an operating mode of the motor vehicle from an at least highly automated operating mode into an at most partially automated operating mode.

A further step of the method is changing the at least one active safety system from the first configuration to the second configuration when a change is recognized.

The above explanations concerning the device according to the invention according to the first aspect of the invention also apply, mutatis mutandis, to the method according to the invention according to the second aspect of the invention. Advantageous exemplary embodiments of the method according to the invention that are not explicitly described at this juncture and in the patent claims correspond to the advantageous exemplary embodiments of the device according to the invention that are described above or described in the patent claims.

The invention is described below on the basis of an exemplary embodiment with the aid of the accompanying drawings.

DETAILED DESCRIPTION OF THE DRAWINGS

Figure 1:
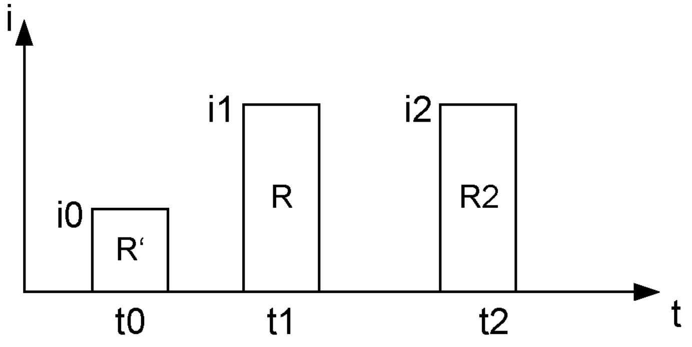
FIG. 1 shows one exemplary embodiment for reactions of an active safety system.

FIG. 1 shows one exemplary embodiment for reactions of an active safety system of an automated motor vehicle, wherein the active safety system is coupled to a controller according to embodiments of the invention for changing between a respective first configuration k1 and a respective second configuration k2 of the active safety system.

The controller is designed to recognize a change in an operating mode of the automated motor vehicle from an at least highly automated operating mode into an at most partially automated operating mode, and to change the at least one active safety system from the first configuration k1 to the second configuration k2 when a change is recognized.

In this case, a reaction R' of the at least one active safety system in the case of the second configuration k2 is triggered at an earlier point in time t0 than a point in time t1 at which the reaction R in the case of the first configuration k1 of the at least one active safety system would have been triggered.

Moreover, the reaction R' of the at least one active safety system in the case of the second configuration k2 is triggered with a lower intensity i0 than the intensity i1 with which the reaction R in the case of the first configuration k1 of the at least one active safety system would have been triggered.

Furthermore, the at least one active safety system is designed to trigger at least two different reactions R, R2 dependent on the configuration k of the respective active safety system, and wherein a triggering point in time t0 and/or an intensity i0 of at least one of these reactions R' in the case of the second configuration k2 differ(s) from a triggering point in time t1 and/or an intensity i1 of at least one reaction R in the case of the first configuration k.

In the present case, the reaction R in accordance with the first configuration k1 is triggered earlier and with lower intensity i0 than reaction R' in the case of the second configuration k2 and a further reaction R2 is additionally triggered at a later point in time.

This change is caused for example by the fact that the controller is designed to ascertain an influencing variable, and to alter the second configuration k2 of the at least one active safety system depending on the influencing variable when a change in the operating mode of the automated motor vehicle is recognized.

Figure 2:
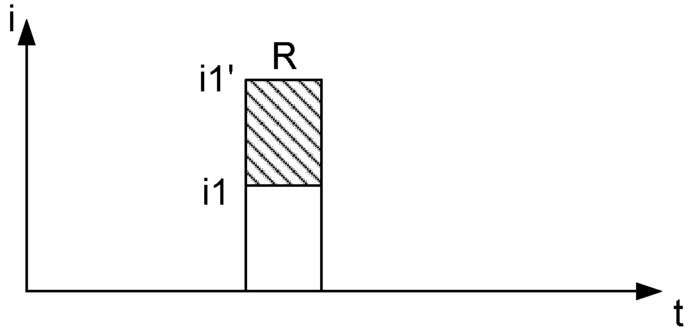
FIG. 2 shows a further exemplary embodiment for reactions of an active safety system.

FIG. 2 shows a further exemplary embodiment for a reaction of an active safety system of an automated motor vehicle, wherein the active safety system is coupled to a controller according to embodiments of the invention for changing between a respective first configuration k1 and a respective second configuration k2 of the active safety system.

In this case, the controller is designed to recognize a change in an operating mode of the automated motor vehicle from an at least highly automated operating mode into an at most partially automated operating mode, in particular from a highly automated operating mode into an operating mode without automation, and to change the at least one active safety system from the first configuration k1 to the second configuration k2 when a change is recognized.

In this case, a reaction R of the at least one active safety system in the case of the second configuration k2 is triggered with a higher intensity i1' than the intensity i1 with which the reaction R would have been triggered in the case of the first configuration k1 of the at least one active safety system.

Figure 3:
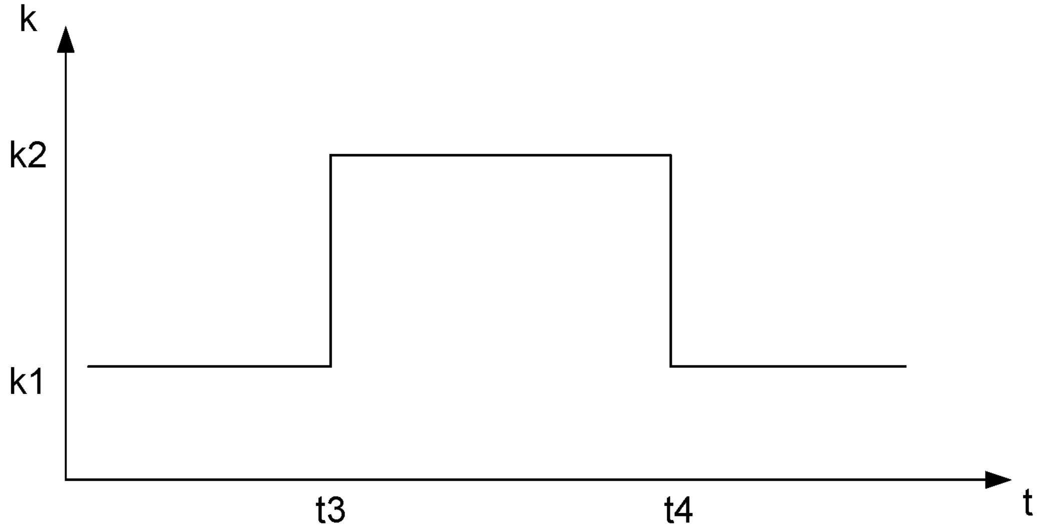
FIG. 3 shows one exemplary embodiment for changes of a configuration of an active safety system.

FIG. 3 shows one exemplary embodiment for changes of a configuration of an active safety system.

The controller according to embodiments of the invention for changing between a respective first configuration k1 and a respective second configuration k2 of at least one active safety system of an automated motor vehicle is designed to recognize a change in an operating mode of the automated motor vehicle from an at least highly automated operating mode into an at most partially automated operating mode at a point in time t3, and to change the at least one active safety system from the first configuration k1 to the second configuration k2 when a change is recognized.

Moreover, the controller is designed to determine a point in time t4 after the change of the at least one active safety system from the first configuration k1 to the second configuration k2, and to change the at least one active safety system from the second configuration k2 to the first configuration k1 depending on this point in time, for example at this point in time.

The invention claimed is:

1. A controller for changing between a first configuration and a second configuration of at least one active safety system of an automated motor vehicle, wherein the controller is configured:

to recognize a change in an operating mode of the automated motor vehicle from an at least highly automated operating mode into an at most partially automated operating mode, and to change the at least one active safety system from the first configuration to the second configuration in response to the change in the operating mode being recognized, wherein a reaction of the at least one active safety system in the second configuration is triggered at an earlier point in time than a point in time at which a reaction in the first configuration of the at least one active safety system would have been triggered, and wherein the reaction of the at least one active safety system in the second configuration is triggered with a lower intensity than an intensity at which the reaction in the first configuration of the at least one active safety system would have been triggered.

2. The controller according to claim 1, wherein the at most partially automated operating mode is an operating mode without automation.

3. The controller according to claim 1, wherein:
the at least one active safety system is configured to trigger at least two different reactions dependent on a configuration of the respective active safety system, and
a triggering point in time and/or an intensity of at least one of the reactions in the second configuration differs from a triggering point in time and/or an intensity of at least one of the reactions in the first configuration.

4. The controller according claim 1, wherein the controller is further configured:
to determine a point in time after the change of the at least one active safety system from the first configuration to the second configuration, and
to change the at least one active safety system from the second configuration to the first configuration depending on the point in time.

5. The controller according to claim 4, wherein the controller is further configured:
to ascertain an influencing variable, and
to determine the point in time depending on the influencing variable.

6. The controller according to claim 1, wherein the controller is further configured:
to ascertain an influencing variable, and
to alter the second configuration of the at least one active safety system depending on the influencing variable when the change in the operating mode of the automated motor vehicle is recognized.

7. The controller according to claim 1, wherein:
the automated motor vehicle comprises at least two active safety systems, and
the controller is further configured to change at least one subset of the at least two active safety systems from the first configuration to the second configuration when the change in the operating mode of the automated motor vehicle is recognized.

8. The controller according to claim 1, wherein the controller is further configured:
to determine a variable that is characteristic of a readiness for driving of a driver of the automated motor vehicle, and
to alter the second configuration of the at least one active safety system depending on the variable that is characteristic of the readiness for driving of the driver of the automated motor vehicle when the change in the operating mode of the automated motor vehicle is recognized.

9. The controller according to claim 8, wherein the variable that is characteristic of the readiness for driving of the driver of the automated motor vehicle is characteristic of a readiness for driving with regard to a longitudinal and/or a lateral control of the automated motor vehicle.

10. The controller according to claim 1, wherein:
the at most partially automated operating mode is an assisted operating mode in which either a longitudinal control or a lateral control of the motor vehicle continues to be affected in an automated manner, and
the controller is further configured to change at least one active safety system for the longitudinal control or the lateral control that is no longer affected in an automated manner from the first configuration to the second configuration when the change is recognized.

11. A method for changing between a first configuration and a second configuration of at least one active safety system of an automated motor vehicle, the method comprising:
recognizing a change in an operating mode of the motor vehicle from an at least highly automated operating mode into an at most partially automated operating mode, and
changing the at least one active safety system from the first configuration to the second configuration in response to the change in the operating mode being recognized,
wherein a reaction of the at least one active safety system in the second configuration is triggered at an earlier point in time than a point in time at which a reaction in the first configuration of the at least one active safety system would have been triggered, and
wherein the reaction of the at least one active safety system in the second configuration is triggered with a lower intensity than an intensity at which the reaction in the first configuration of the at least one active safety system would have been triggered.

* * * * *